(12) United States Patent
Yoshida

(10) Patent No.: US 7,743,726 B2
(45) Date of Patent: Jun. 29, 2010

(54) INDICATION INSTRUMENT

(75) Inventor: Takaki Yoshida, Ni Igata (JP)

(73) Assignee: Nippon Seiki Co., Ltd., Niigata (JP)

( * ) Notice: Subject to any disclaimer, the term of this patent is extended or adjusted under 35 U.S.C. 154(b) by 1 day.

(21) Appl. No.: 12/162,734

(22) PCT Filed: Dec. 13, 2006

(86) PCT No.: PCT/JP2006/324819

§ 371 (c)(1),
(2), (4) Date: Jul. 30, 2008

(87) PCT Pub. No.: WO2007/086205

PCT Pub. Date: Aug. 2, 2007

(65) Prior Publication Data

US 2009/0056616 A1    Mar. 5, 2009

(30) Foreign Application Priority Data

Jan. 30, 2006    (JP) ................................ 2006-020848

(51) Int. Cl.
*G01D 11/28* (2006.01)
(52) U.S. Cl. .................................... 116/287; 116/288
(58) Field of Classification Search ................. 116/281, 116/286–288, 300
See application file for complete search history.

(56) References Cited

U.S. PATENT DOCUMENTS

| | | | |
|---|---|---|---|
| 6,408,783 B1 * | 6/2002 | Ludewig | 116/288 |
| 6,601,532 B1 * | 8/2003 | Olbrich | 116/288 |
| 7,159,534 B2 * | 1/2007 | Tanaka et al. | 116/300 |
| 7,347,160 B2 * | 3/2008 | Honma et al. | 116/288 |
| 7,482,915 B2 * | 1/2009 | Sumiya et al. | 340/461 |
| 7,520,243 B2 * | 4/2009 | Takato | 116/300 |

FOREIGN PATENT DOCUMENTS

| | | |
|---|---|---|
| JP | 60-118916 | 8/1985 |
| JP | 2002-039807 | 2/2002 |
| JP | 2003-14508 | 1/2003 |
| JP | 2005-274438 | 10/2005 |
| JP | 2005-338059 | 12/2005 |

* cited by examiner

*Primary Examiner*—R. A. Smith
*Assistant Examiner*—Tania C Courson
(74) *Attorney, Agent, or Firm*—McDermott Will & Emery LLP

(57) ABSTRACT

An indication instrument with improved illumination efficiency. The indication instrument has an indication panel (100), an indication plate (200) on which index parts (201) are disposed along the outer periphery of the indication panel (100), a pointer (11) for indicating the index parts (201), a drive source (7) for driving the pointer (11), and an indication plate light source (light source) (700) for illuminating the indication plate (200). The pointer (11) is routed around the rear of the indication panel (100) to reach the front of the indication plate (200). The indication instrument further comprises a frame (300) for joining to each other the indication panel (100), the indication plate (200), and the light source (700). An illumination chamber (R1) for guiding the light of the light source (700) to the indication plate (200) is formed in the frame (300).

4 Claims, 2 Drawing Sheets

INDICATION INSTRUMENT

RELATED APPLICATIONS

This application is the U.S. National Phase under 35 U.S.C. §371 of International Application No. PCT/JP2006/324819, filed on Dec. 13, 2006, which in turn claims the benefit of Japanese Application No. 2006-020848, filed on Jan. 30, 2006, the disclosures of which Applications are incorporated by reference herein.

TECHNICAL FIELD

The present invention relates to an indication instrument that is installed in a vehicle or the like and to a type of indication instrument where, in order to perform information display by an electronic display panel in the center of a pointer display part that comprises a pointer and a display plate, the pointer is routed around the rear of the display panel to reach the front of the display plate.

BACKGROUND ART

As this type of indication instrument, the indication instrument described in Patent Document 1 listed below, for example, is known. This indication instrument is disposed with a display panel that comprises a liquid crystal panel, a display plate on which index parts are disposed along the outer periphery of the display panel, a pointer that indicates the index parts, a drive source (a revolving internal mechanism) that is disposed on the rear of the display panel in order to drive the pointer, a circuit board to which the drive source attaches and which is disposed a predetermined distance away from the display panel, and a light source that is disposed in front of the circuit board and illuminates the display plate and the display panel. The rotating base part of the pointer is coupled to a drive shaft of the drive source, and the free end side of the pointer curves such that it is routed around the rear of the display panel to reach the front of the display plate. In order to enable movement of the pointer that is curved in this manner, the distance between the display panel and the circuit board is set to a size that can allow operation of the pointer. Additionally, the light source that is positioned on the circuit board has a structure that faces the display plate and the display panel, with the above-described distance being disposed therebetween, and illuminates the display plate and the display panel by the lighting of the light source.

Patent Document 1: JP-A-2003-14508

DISCLOSURE OF THE INVENTION

Problem that the Invention is to Solve

However, in Patent Document 1, the light source amounts to nothing more than a structure that faces the display plate and the display panel, with the distance for allowing operation of the pointer being disposed therebetween, so there is the problem that it is difficult to control the light path that leads from the light source to the display plate and the display panel, which are illumination targets, and this easily leads to a drop in illumination efficiency. Further, there is also the problem that the indication instrument cannot handle a case where the display plate and the display panel are illuminated in different colors using light sources of different colors, for example.

The present invention has been implemented in view of this point, and it is a main object thereof to provide an indication instrument whose illumination efficiency is capable of being improved.

Means for Solving the Problem

In order to solve the aforementioned problem, the present invention is characterized in that it is an indication instrument comprising: a display panel; a display plate on which index parts are disposed along the outer periphery of the display panel; a pointer that indicates the index parts; a drive source that drives the pointer; and a light source that illuminates at least the display plate, with the pointer being routed around the rear of the display panel to reach the front of the display plate, wherein the indication instrument is disposed with a frame that joins together the display panel, the display plate and the light source, and an illumination chamber that guides the light of the light source to the display plate is disposed in the frame.

Further, the present invention is characterized in that the frame is coupled to a predetermined rigid body in a non-moving area of the pointer.

Further, the present invention is characterized in that the indication instrument further includes a light source substrate to which the light source attaches, wherein the light source is united with the frame via the light source substrate.

Further, the present invention is characterized in that the light source comprises a light source that also illuminates the display panel in addition to the display plate or light sources that separately illuminate the display plate and the display panel, and the illumination chamber is partitioned into an illumination chamber that illuminates the display plate and an illumination chamber that illuminates the display panel.

Effects of the Invention

According to the present invention, there can be provided an indication instrument whose illumination efficiency is capable of being improved.

DESCRIPTION OF THE REFERENCE SIGNS

1 Pointer
2 Shielding Member
3 Front Cover
4 Case (Rigid Body)
5 Circuit Board
6 Rear Cover
7 Drive Source
8 Pointer-use Light Source
11 First Portion
12 Second Portion
12a Reflecting Part
12b Boss Part
13 Coupling Member 41 Attachment Receiving Part
42 Recessed Part
43 Hole Part
51, 61 Through Holes
71 Drive Shaft
100 Display Panel
200 Display Plate
201 Index Part
202 Window Part
300 Frame
301 Partitioning Part
302 Attachment Part
303 Hole Part
400 Light Guide
401 Light Collecting Part
402 Radiant Reflecting Part
500 Light Source Substrate
600 Display Panel-use Light Source (Light Source)
700 Display Plate-use Light Source (Light Source)
800 Screw
900 Light Source
F Fixing Member
MA Moving Area
NMA Non-moving Area
PD1 to PD3 Pointer Display Parts
R Illumination Chamber
R1 First Illumination Chamber
R2 Second Illumination Chamber
S Space
U Display Unit
VC Virtual Center-of-Rotation

BEST MODES FOR IMPLEMENTING THE INVENTION

Below, embodiments of an indication instrument to which the present invention is applied will be described on the basis of the attached drawings.

Figure 1:
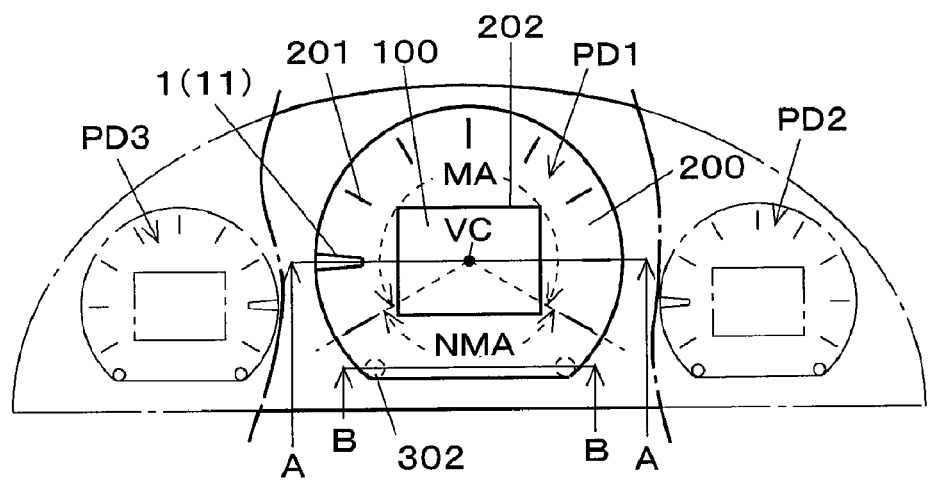
[FIG. 1] A front view of an indication instrument according to the present invention.
Figure 2:
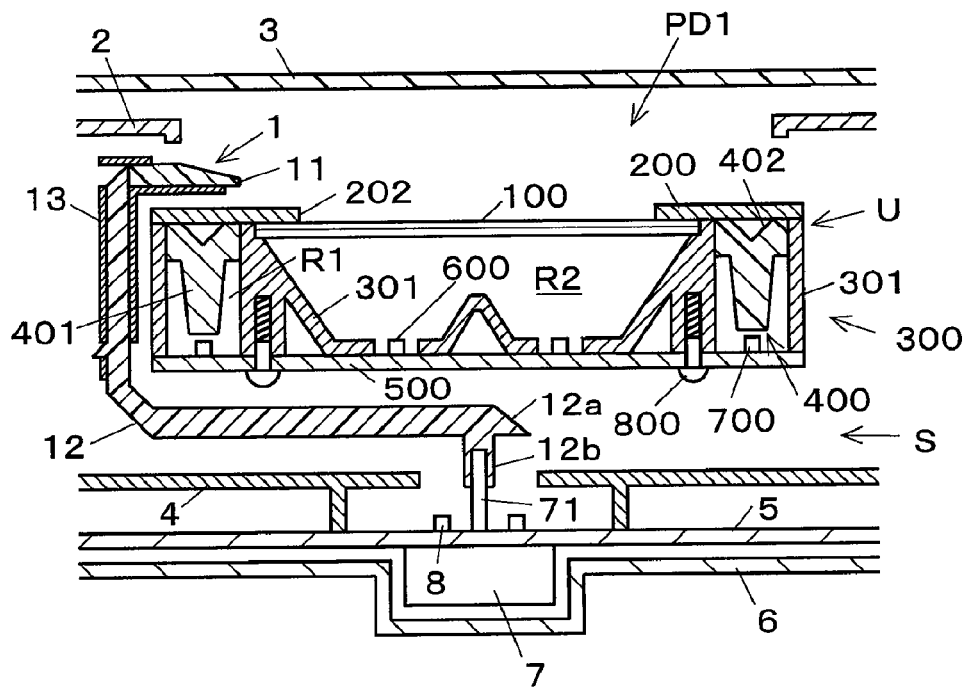
[FIG. 2] A cross-sectional view along A-A of FIG. 1.
Figure 3:
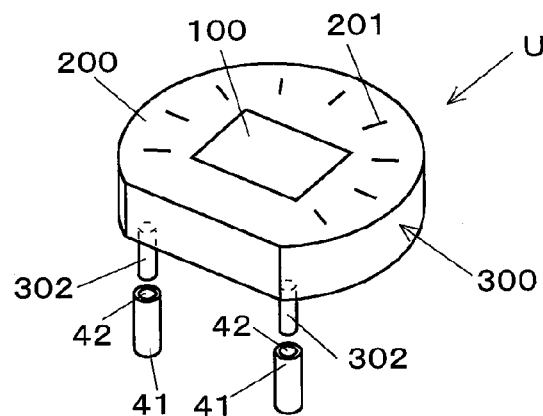
[FIG. 3] A perspective view showing a display unit and part of a case.
Figure 4:
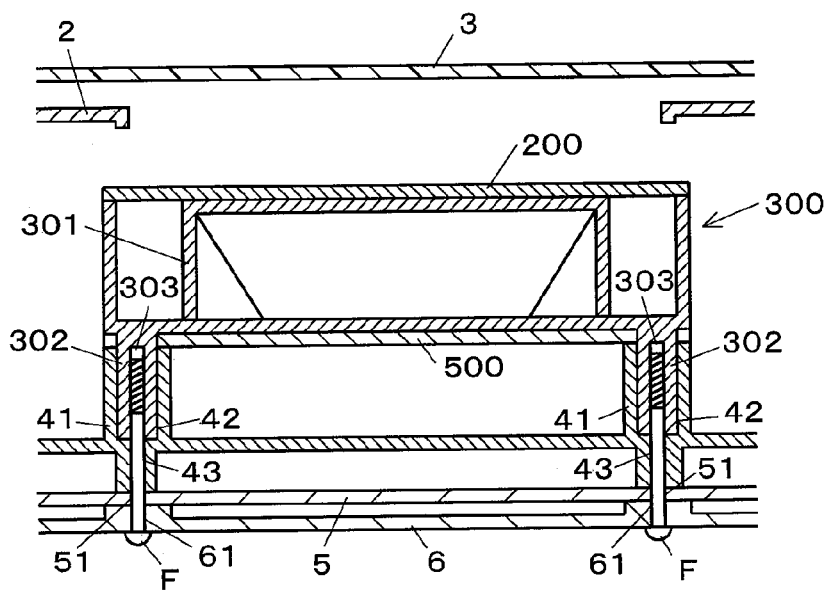
[FIG. 4] A cross-sectional view along B-B of FIG. 1.

FIG. 1 to FIG. 4 show a first embodiment of the present invention. FIG. 1 is a front view of an indication instrument, FIG. 2 is a cross-sectional view along A-A of FIG. 1, FIG. 3 is a perspective view showing a display unit and part of a case, and FIG. 4 is a cross-sectional view along B-B of FIG. 1.

The indication instrument according to the present embodiment comprises a combination meter that is installed in a dashboard of an automobile, for example, and, as shown in FIG. 1, comprises three pointer display parts that display different types of measurement values and are arranged in a horizontal row. The overall outer shape of the indication instrument is a substantially vaulted shape. It will be noted that, in FIG. 1, just a pointer display part PD1 that is positioned in the center is shown in detail, and pointer display parts PD2 and PD3 that are positioned on both sides are represented by one-dotted chain lines.

The mechanical configurations of each of the pointer display parts PD1 to PD3 are the same in their basic portions. The only difference is that the contents of the display parts such as types of measurement values, etc. Using the pointer display part PD1 as a representative, as shown in FIG. 2, each of the pointer display parts PD1 to PD3 is configured by a pointer 1 and a display unit U (both of which will be described in detail later).

A shielding member (a facing member or a mask member) 2 is disposed in front of the pointer 1 and the display unit U. The shielding member 2 comprises a light-blocking synthetic resin material (e.g., black), for example. An opening that exposes the necessary parts of the pointer display parts PD1 to PD3 and conceals the unnecessary parts is formed in the shielding member 2.

A front cover 3 that comprises a translucent synthetic resin material (e.g., transparent and colorless), for example, is disposed in front of the shielding member 2 and prevents the entry of dust and the like.

A case (a rigid body) 4, a circuit board 5 and a rear cover 6 are respectively positioned behind (on the rear of) the display unit U.

The case 4 is a rigid body whose general shape comprises a bottomed frame and houses the pointer 1, the display unit U and the like that configure each of the pointer display parts PD1 to PD3, and becomes a core part to which the shielding member 2, the front cover 3, the circuit board 5 and the rear cover 6 are directly or indirectly attached.

Additionally, a space S that allows operation of the pointer 1 is formed between the (bottom part of the) case 4 and the circuit board 5.

The circuit board 5 is a hard circuit board that is disposed on the rear of the (bottom part of the) case 4. The body part of a drive source 7 that comprises a stepping motor, for example, is attached to the rear surface of the circuit board 5. A drive shaft 71 of the drive source 7 penetrates the circuit board 5, extends frontward, and is connected to the pointer 1. Further, a pointer-use light source 8 that comprises a light-emitting diode, for example, for illuminating the pointer 1 is disposed on the front surface of the circuit board 5 around the drive shaft 71.

The rear cover 6 covers and protects the rear surface of the circuit board 5.

A combination meter is configured by the rear cover 6, the circuit board 5, the case 4, the pointer 1 and the display unit U that configure the pointer display parts PD1 to PD3, the shielding member 2 and the front cover 1.

Next, the detailed structure of the pointer 1 and the display unit U will be described.

The pointer 1 is configured by a first portion 11 that is visible to a viewer, a second portion 12 that is not visible to a viewer, and a coupling member 13 for coupling together the first and second portions 11 and 12. The first and second portions 11 and 12 both comprise a transparent synthetic resin material, for example. The coupling member 13 comprises a light-blocking synthetic resin material (e.g., black), for example.

The first portion 11 has a rod-like shape that extends in a tapered shape along the front surface (a later-described display plate) of the display unit U. A colored layer that comprises an unillustrated hot stamp layer for determining the viewing color is disposed on the rear surface or the front surface of the first portion 11.

The second portion 12 comprises a rod-like body that extends so as to be routed in a crank shape from the side surface of the display unit U toward the rear surface. The second portion 12 is disposed with a reflecting part 12a, which reflects light from the pointer-use light source 8 in the longitudinal direction thereof, and a boss part 12b, which extends along the drive shaft 71 and is insertingly coupled to the drive shaft 71. The free end part of the second portion 12 that is on the opposite side of the boss part 12b faces the first portion 11.

The coupling member 13 has a generally box-like shape that partially houses the first and second portions 11 and 12.

The pointer 1 that is configured in this manner is routed around the rear of the display unit U (a later-described display panel) to reach the front of the display unit U (the later-described display plate) and rotationally moves (revolves)

around the outer periphery of the display unit U using the drive shaft 71 as a reference in accompaniment with the rotation of the drive shaft 71 of the drive source 7. Further, when the pointer-use light source 8 lights up, the light is guided via the second portion 12 to the first portion, and the first portion 11 emits the light.

The display unit U is configured by a display panel 100, a display plate 200, a frame 300, a light guide 400, a light source substrate 500, a display panel-use light source (light source) 600, a display plate-use light source (light source) 700, and screws 800. It will be noted that each of the light sources 600 and 700 comprises a light-emitting diode, for example.

The display panel 100 comprises a liquid crystal display panel such as an STN (Super Twisted Nematic) or a TN (Twisted Nematic) display panel, for example, is disposed in the center of the display unit U, and displays various information (e.g., vehicle information comprising outside air temperature information, traveling distance information and fuel consumption information, and traffic information comprising navigation information, for example). It will be noted that, although the display panel 100 itself has a rectangular shape when seen from the front cover 3 side, an arbitrarily shaped panel, such as a trapezoidal or circular panel, can also be used.

The display plate 200 is disposed along the outer periphery of the display panel 100 and includes index parts (comprising scale markings and characters, but in FIG. 1, just scale markings are shown and numerical characters are omitted) that become indication targets of the pointer 1 and a window part 202 that exposes the necessary parts of the display panel 100. The display panel 100 is viewed from the window part 202. Therefore, the display plate 200 is positioned on the outer periphery of the display panel 100. It will be noted with respect to the display plate 200 that it suffices as long as the display panel 100 can be seen and the index parts 201 are positioned on the outer periphery of the display panel 100, and the display plate 200 may also be disposed with a transparent see-through part instead of the window part 202. Further, an ordinary transmissive printed display plate whose index parts 201 transmit light and whose other parts block light, for example, is employed as the display plate 100 itself, and the outer shape of the display plate as seen from the front cover 3 side is generally D-shaped.

The frame 300 comprises, for example, a white synthetic resin material whose light reflectivity is good, and the outer shape of the frame 300 as seen from the front cover 3 side is generally D-shaped, which corresponds to the shape of the display plate 200. The frame 300 is partitioned by a wall-like partitioning part 301, and a first illumination chamber R1 that corresponds to the display plate 200 and a second illumination chamber R2 that corresponds to the display panel 100 are formed in the frame 300.

The first illumination chamber R1 is formed in a circular arc shape along the arranged shape of the index parts 201, the display plate 200 is installed on the front side thereof, the display plate-use light source 700 is disposed on the rear surface side thereof, and the light guide 400 is disposed between the display plate 200 and the display plate-use light source 700.

The light guide 400 is, in this example, formed in a circular arc shape along the first illumination chamber R1, and a light introducing part 401 that projects toward the display plate-use light source 700 and a conically shaped radiant reflecting part 402 are formed in a position corresponding to the display plate-use light source 700.

Additionally, when the display plate-use light source 700 lights up, the light thereof is introduced to the inside of the light guide 400 via the light introducing part 401 and is radially reflected by the radial reflecting part, whereby the light propagates in the plate surface direction of the display plate 200. Thus, a relatively wide range of the index parts 201 can be illuminated using a point light source, and light leakage and loss can be controlled as a result of the illumination path that leads from the display plate-use light source 700 to the display plate 200 being partitioned by the first illumination chamber R1 (the partitioning part 301).

The second illumination chamber R2 is, in this example, formed in a square pyramid shape whose width on the front side is wide and whose width on the opposite side is narrow. The display panel 100 is installed on the front side whose width is wide, and the display panel-use light source 600 is disposed on the rear surface side whose width is narrow.

Additionally, when the display panel-use light source 600 lights up, the light thereof is reflected back inside the second illumination chamber R2. As a result, the entire display panel 100 can be illuminated using a point light source, and light leakage and loss can be controlled as a result of the illumination path that leads from the display panel-use light source 600 to the display panel 100 being partitioned by the second illumination chamber R2 (the partitioning part 301).

The display panel-use light source 600 and the display plate-use light source 700 are attached to the front surface side of the light source substrate 500 and attached and fixed via the screws 800 to the rear of the frame 300, whereby the display panel-use light source 600 and the display plate-use light source 700 are positioned inside each of the illumination chambers R1 and R2.

Here, the frame 300 becomes a core part that joins together the display panel 100, the display plate 200, the light guide 400 and the light source substrate 500 (the display panel-use light source 600 and the display plate-use light source 700). It will be noted that, in the present example, the display panel 100, the display plate 200, the light guide 400 and the light source substrate 500 are directly joined to the frame 300 by hooks or double-sided tape, but they may also be joined indirectly via another member. Further, in this example, the screws 800 are used when attaching the light source substrate 500 to the frame 300, but the invention is not limited to joining of these parts, and arbitrary means may be used for the fixing members and fixing means.

The display unit U that is configured as described above is, as shown in FIG. 3 and FIG. 4, attached and fixed in a cantilevered state via attachment parts 302 formed in the frame 300.

That is, the attachment parts 302 are formed on the rear surface side of the frame 300 and in an area (see FIG. 1) that is positioned in a non-moving area NMA-corresponding area (projection area) away from a moving area (range) MA-corresponding area of the pointer 1 such that the attachment parts 302 do not hinder the movement of the pointer 1. In this example, the attachment parts 302 are a pair of circular cylinder-shaped projecting parts that extend toward the case 4, and hole parts 303, into which fixing members F comprising self-tapping screws, for example, are screwed, are formed inside the attachment parts 302.

Attachment receiving parts 41 are formed in positions in the case 4 that correspond to the attachment parts 302. In this example, the attachment receiving parts 41 are formed in circular cylinder shapes that open toward the attachment parts 302. Recessed parts 42, into which the attachment parts 302 are capable of being inserted and positioned, are formed inside the attachment receiving parts 41. Hole parts 43, into which the fixing members F are capable of being passed, are formed in the bottom parts of the recessed parts 42. It will be noted that through holes 51 and 61, through which the fixing members F are passed, are respectively formed in the circuit board 5 and the rear cover 6 that are positioned on the rear of the case 4.

Attachment of the display unit U with respect to the case 4 is performed by inserting and temporary fastening the attachment parts 302 of the display unit U into the attachment receiving parts 41 (the recessed parts 42) of the case 4, thereafter placing the circuit board 5 and the rear case 6 on the rear of the case 4, centering the through holes 51 and 61 that are disposed in these and the hole parts 43 and 303 that are disposed in the case 4 and the attachment parts 302, thereafter inserting the fixing members F into the through holes 51 and 61 and the hole parts 43 from the rear (the rear cover 6 side), and then screwing the distal end sides of the fixing members F into the hole parts 303. Thus, the display unit U is stably fixed in a cantilevered state to the case 4 that is a rigid body without hindering operation of the pointer 1.

It will be noted that as long as attachment of the display unit U with respect to the case 4 is attachment where the display unit U is coupled to the case 4 in the non-moving area NMA of the pointer 1, dedicated fittings may also be interposed between the display unit U and the case 4 instead of recessed and projecting fittings such as the attachment parts 302 and the attachment receiving parts 41 such as described above.

Further, the attachment target of the display unit U is not limited to the case 4 and is arbitrary as long as it is a rigid body that can stably support the display unit U, and may also be the circuit board 5, the rear cover 6, the shielding member 2, or another member, for example.

Moreover, as long as the attachment parts 302 are in an area away from the moving area MA of the pointer 1 that widens in a fan-like manner using a virtual center-of-rotation VC as a base point, they may also be disposed on an extended trajectory of the revolving trajectory of the pointer 1 in the non-moving area NMA-corresponding area as in FIG. 1 or may be on the outer side or the inner side with respect to the extended trajectory.

As described above, in the present embodiment, the indication instrument comprises: the display panel 100; the display plate 200 on which the index parts 201 are disposed along the outer periphery of the display panel 100; the pointer 1 that indicates the index parts 201; the drive source 7 that drives the pointer 1; and the display plate-use light source (light source) 700 that illuminates the display plate 200, with the pointer 1 being routed around the rear of the display panel 100 to reach the front of the display plate 200, wherein the indication instrument is disposed with the frame 300 that joins together the display panel 100, the display plate 200 and the display plate-use light source 700, and the illumination chamber R1 that guides the light of the display plate-use light source 700 to the display plate 200 is disposed in the frame 300. Thus, illumination efficiency can be improved. That is, because the illumination path that leads from the display plate-use light source 700 to the display plate 200 is partitioned by the first illumination chamber R1 (the partitioning part 301), light leakage and loss can be controlled, and the display plate 200 can be efficiently illuminated utilizing the reflective action of the wall surface of the illumination chamber R1.

Further, in the present embodiment, the frame 300 is coupled to the case 4 in the non-moving area NMA of the pointer 1. Thus, the display unit U (the frame 300) can be attached without affecting the movement of the pointer 1. Further, the display unit U can be attached to utilizing excess (leeway) space that does not directly contribute to the movement of the pointer 1, so space can be effectively utilized.

Further, in the present embodiment, the indication instrument further includes the light source substrate 500 to which the display plate-use light source 700 attaches, wherein the light source 700 is united with the frame 300 via the light source substrate 500. Thus, when the display plate-use light source 700 is united with the frame 300, a cord and dedicated holding tool become unnecessary, and the display plate-use light source 700 can be attached to the frame 300 with the minimum number of parts required.

Further, in the present embodiment, the light source comprises the display plate-use light source 700 that illuminates the display plate 200 and the display panel-use light source 600 that illuminates the display panel 100, and the illumination chamber is partitioned into the illumination chamber R1 that illuminates the display plate 200 and the illumination chamber R2 that illuminates the display panel 100. Thus, the display plate 200 and the display panel 100 can be illuminated separately, so not just the display plate 200 but also the display panel 100 can be efficiently illuminated. Further, according to this structure, the display plate 200 and the display panel 100 can also be illuminated in separate light source colors while preventing mutual color interference.

It will be noted that, in the present embodiment, a liquid crystal display panel is used as the display panel 100, but an arbitrary panel can be employed as long as it is a display panel or information indicating means using a display panel. For example, a display panel such as an electroluminescence element or a fluorescent indicator tube may also be disposed instead of the liquid crystal display panel (in this case, the display panel-use light source 600 is unnecessary), or a pointer display unit that employs an ordinary printed character plate as a display panel may also be disposed instead of the liquid crystal display panel or the display unit U.

Further, in the present embodiment, an example has been described where the display unit U includes the display plate 200 and the display panel 100, but other display/informing means may also be incorporated in the display unit U in addition to these.

Figure 5:
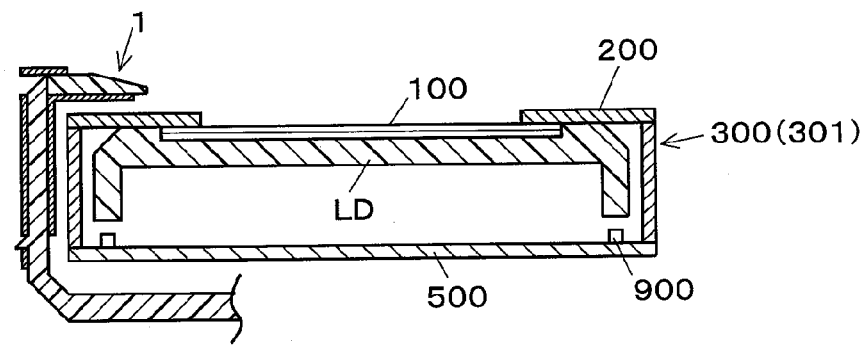
[FIG. 5] A cross-sectional view of relevant parts showing a second embodiment of the present invention.

FIG. 5 is a cross-sectional view of relevant parts showing a second embodiment of the present invention. In the present embodiment, an example will be described where both the display plate 200 and the display panel 100 are illuminated in one illumination chamber R.

That is, a single illumination chamber R is formed in the frame 300, and the display plate 200 and the display panel 100 are disposed in the front.

The light guide LD is disposed between the display plate 200 and the display panel 100 and the light source substrate 500, the light from a light source 900 is guided to the display plate 200 and the display panel 100 using a light guide LD, and these are illuminated.

According to the second embodiment also that is configured in this manner, the same effects as those of the first embodiment can be expected.

It will be noted that, in the first and second embodiments, examples have been described where the first portion 11 of the pointer 1 extends from the outer side of the display unit U toward the center (the pointer 1 is routed in a "U" shape with respect to the display unit U), but the pointer 1 may also be set in a "T" shape or a crank shape by configuring the indication instrument such that a slit through which the pointer 1 passes (is capable of operating) is disposed in the display unit U (the frame 300, the display plate 200 and the light source substrate 500) so that the pointer 1 moves via this slit.

INDUSTRIAL APPLICABILITY

The present invention relates to an indication instrument that is installed in a vehicle or the like and to a type of indication instrument where, in order to perform information display by an electronic display panel in the center of a pointer display part that comprises a pointer and a display plate, the pointer is routed around the rear of the display panel to reach the front of the display plate.

The invention claimed is:

1. An indication instrument comprising:
   a display panel;
   a display plate on which index parts are disposed along the outer periphery of the display panel;
   a pointer that indicates the index parts;
   a drive source that drives the pointer; and
   a light source that illuminates at least the display plate,
   with the pointer being routed around the rear of the display panel to reach the front of the display plate,
   wherein the indication instrument is provided with a frame that connects the display panel, the display plate and the light source together, and an illumination chamber that guides the light of the light source to the display plate is provided in the frame, and
   wherein, the display plate is disposed along the outer periphery of the display panel, the display plate includes a window part, the frame connects the display panel and the display plate so that necessary parts of the display panel are viewed from the window part of the display plate.

2. The indication instrument of claim 1, wherein the frame is coupled to a predetermined rigid body in a non-moving area of the pointer.

3. The indication instrument of claim 1, further including a light source substrate to which the light source attaches, wherein the light source is united with the frame via the light source substrate.

4. The indication instrument of claim 1, wherein the light source comprises a light source that also illuminates the display panel in addition to the display plate or light sources that separately illuminate the display plate and the display panel, and the illumination chamber is partitioned into an illumination chamber that illuminates the display plate and an illumination chamber that illuminates the display panel.

* * * * *